(12) United States Patent
Sugita

(10) Patent No.: US 7,400,960 B2
(45) Date of Patent: Jul. 15, 2008

(54) ABNORMALITY DETECTING APPARATUS FOR AUTOMATIC SPEED CHANGER

(75) Inventor: Yoshiki Sugita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 487 days.

(21) Appl. No.: 10/913,420

(22) Filed: Aug. 9, 2004

(65) Prior Publication Data
US 2005/0015190 A1 Jan. 20, 2005

Related U.S. Application Data

(62) Division of application No. 09/964,698, filed on Sep. 28, 2001, now Pat. No. 6,826,467.

(30) Foreign Application Priority Data
Apr. 10, 2001 (JP) .............................. 2001-111173

(51) Int. Cl.
F16H 61/26 (2006.01)

(52) U.S. Cl. ........................................ 701/62; 477/127

(58) Field of Classification Search .................. 701/62, 701/36, 51, 53, 59, 61–64; 477/127, 130, 477/131, 156, 161–164, 906; 475/121–122, 475/127
See application file for complete search history.

(56) References Cited

U.S. PATENT DOCUMENTS

| 4,393,732 A | 7/1983 | Suzuki et al. |
| 5,562,570 A * | 10/1996 | Nakashima ................. 477/127 |
| 6,024,671 A | 2/2000 | Sawa et al. |

FOREIGN PATENT DOCUMENTS

| JP | 1-172663 A | 7/1989 |
| JP | 5-240331 A | 9/1993 |
| JP | 10-63582 A | 3/1998 |
| JP | 2000-035115 A | 2/2000 |
| JP | 2001-56049 A | 2/2001 |

* cited by examiner

Primary Examiner—Dalena Tran
(74) Attorney, Agent, or Firm—Sughrue Mion, PLLC (57) ABSTRACT

In a conventional abnormality detecting apparatus, it is impossible to judge a breakdown before the breakdown actually takes place. An abnormality detecting apparatus for an automatic speed changer includes a speed change controlling unit for controlling the automatic speed changer; a learn controlling device for optimizing an rpm change at the time of speed change control by the speed change controlling device; and an abnormality detection controlling device for judging whether a learned value of the learn controlling device falls within a range between an upper limit and a lower limit and if the learned value falls out of the range, storing the condition as abnormal. Thus, it is possible to detect the abnormal condition of constituents such as a clutch in the automatic speed changer before the actual breakdown.

6 Claims, 8 Drawing Sheets

ABNORMALITY DETECTING APPARATUS FOR AUTOMATIC SPEED CHANGER

This is a divisional of application Ser. No. 09/964,698 filed Sep. 28, 2001 now U.S. Pat. No. 6,826,467.

This application is based on Application No. 2001-111173, filed in Japan on Apr. 10, 2001, the contents of which are hereby incorporated by reference.

BACKGROUND OF THE INVENTION

1. Field of the Invention

The present invention relates to an abnormality detecting apparatus for a stepped type automatic speed changer.

2. Description of the Related Art

Figure 8:
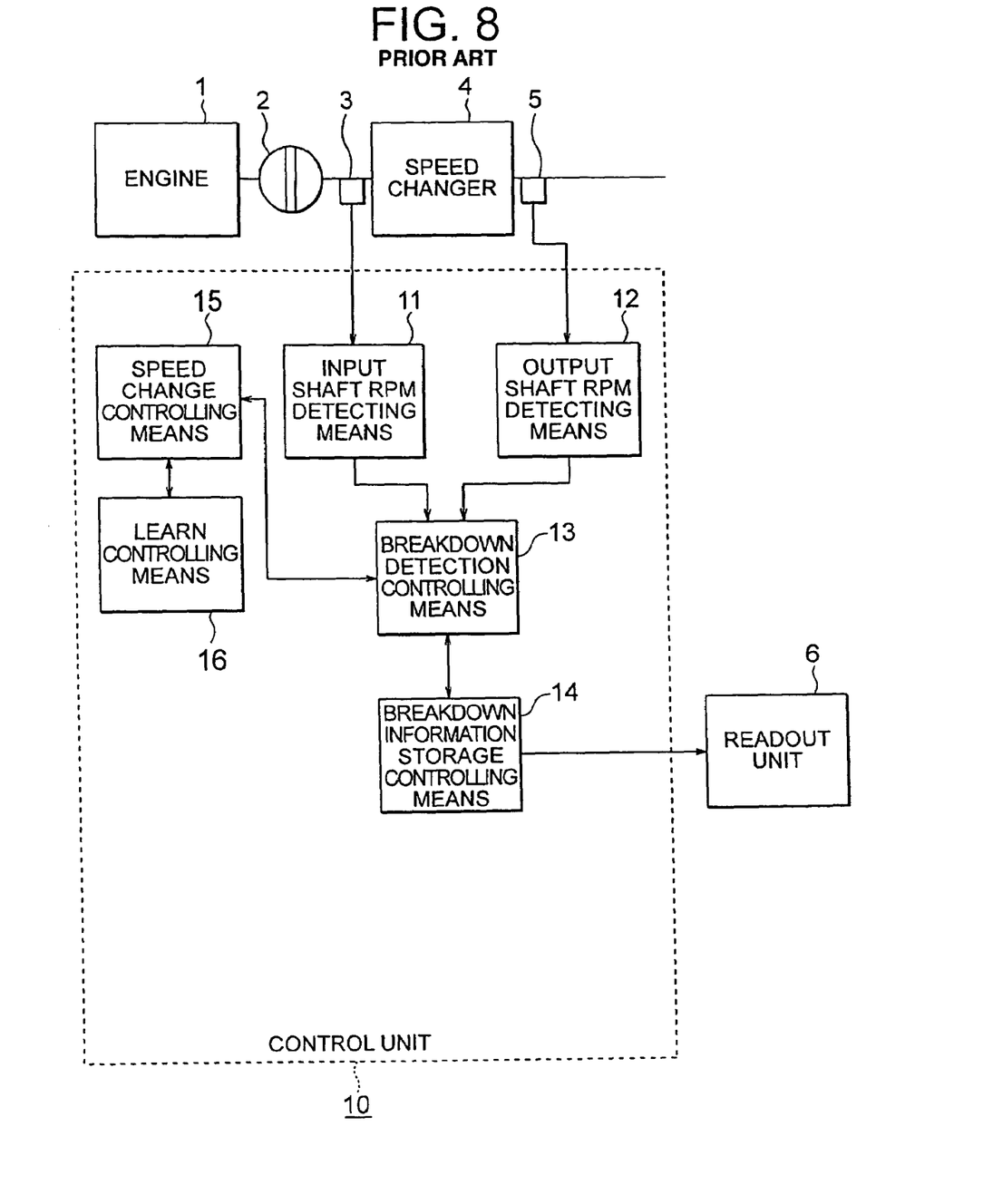
FIG. 8 is a view showing the structure of a conventional abnormality detecting apparatus for an automatic speed changer.

A conventional abnormality detecting apparatus for an automatic speed changer will now be described with reference to a drawing. FIG. 8 is a view showing a structure of the conventional abnormality detecting apparatus for an automatic speed changer.

In FIG. 8, reference numeral 1 denotes an engine, numeral 2 denotes a torque converter, numeral 3 denotes an input shaft rpm sensor, numeral 4 denotes an automatic speed changer, numeral 5 denotes an output shaft rpm sensor and numeral 6 denotes a readout unit. Numeral 10 denotes a control unit (abnormality detecting apparatus for the automatic speed changer), numeral 11 denotes an input shaft rpm detecting means, numeral 12 denotes an output shaft rpm detecting means, numeral 13 denotes a breakdown detection controlling means, numeral 14 denotes a breakdown information storage controlling means, numeral 15 denotes a speed change controlling means for controlling the automatic speed changer 4 and numeral 16 denotes a learn controlling means for optimizing an rpm change at the time of controlling the speed change.

The operation of the conventional abnormality detecting apparatus for the automatic speed changer will now be described with reference to the drawing.

In general, in the automatic speed changer, the speed change is effected by means of constituents of an internal clutch. However, in the case where the clutch is kept in an abnormal condition and the coupling of the constituents is incomplete, there is a fear that the clutch would be damaged by frictional heat or the like or the automatic speed changer as a whole would be damaged due to the coupling condition that is different from the normal condition.

Accordingly, in general, in the automatic speed changer, the abnormality detection of the speed change condition is effected. As shown in FIG. 8, the abnormal detection is effected on the basis of information on an input shaft rpm speed, i.e., NT of the automatic speed changer 4 and an output shaft rpm speed, i.e., NO thereof.

That is, it is possible for the breakdown detection controlling means 13 of the control unit 10 to calculate a theoretical NT by multiplying the NO by the current gear ratio. This theoretical NT and the detected NT at the same time are compared with each other so that it is possible to judge that the condition is normal in the case where the NTs are the same or close to each other whereas it is possible to judge that the condition is abnormal in the case where there is a difference in rpm exceeding a predetermined level.

Then, the breakdown detection controlling means 13 recognizes this abnormal condition as a breakdown that is out of a speed change synchronism and at the same time records it onto the breakdown information storage means 14. After the breakdown is recognized, the speed change controlling means 15 of the control unit 10 causes the speed change control to stop and fixes the system to a speed change step that is a fail safe condition of the automatic speed changer 4.

In the above-described conventional abnormality detecting apparatus for the automatic speed changer, means which can make a decision only after it is actually brought into the breakdown condition is used. For this reason, when the control unit 10 recognizes an abnormality, the automatic speed changer 4 has already been in the breakdown condition and can not perform the speed change operation. Accordingly, there is a problem that the drivability is deteriorated for the user.

Also, in the case where the abnormality of the automatic speed changer 4 gradually develops, even if a periodical inspection is positively performed by using a repair and inspection method of current general standards, there is a problem that it is difficult to detect the abnormal condition.

SUMMARY OF THE INVENTION

This invention has been made in order to solve the above-described problems. It is accordingly an object of the present invention to provide an abnormality detecting apparatus for an automatic speed changer that detects and stores an abnormal condition before a complete breakdown of the automatic speed changer, and readily predicts the breakdown at the time of an inspection.

According to a first aspect of this invention, there is provided an abnormality detecting apparatus for an automatic speed changer, comprising: a speed change controlling means for controlling the automatic speed changer; a learn controlling means for optimizing an rpm change at the time of speed change control by the speed change controlling means; and an abnormality detection controlling means for which judges whether a learned value of the learn controlling means falls within a range between an upper limit and a lower limit and which, if the learned value falls out of the range, records the condition as abnormal.

According to a second aspect of this invention, there is provided an abnormality detecting apparatus for an automatic speed changer, comprising: a speed change controlling means for controlling the automatic speed changer; a learn controlling means for optimizing an rpm change at the time of speed change control by the speed change controlling means; a learned value supervision controlling means for supervising a change in a learned value of the learn controlling means, counting up a learned value non-change counter if there is no change in the learned value, and regarding that the learned value as converged and recording it when the value of the learned value non-change counter is not less than a predetermined set value; and an abnormality detection controlling means which, when the learned value is detected to be changed again after it has been judged by the learned value change supervision controlling means that the learned value change has been once converged records the condition as abnormal.

According to a third aspect of this invention, in the abnormality detecting apparatus for the automatic speed changer, the abnormality detection controlling means is adapted to set a threshold value after the convergence of the learned value in the case where a predetermined threshold value has not been set, and if the threshold value after the convergence of the learned value has been set, records the condition as abnormal when the current learned value exceeds the set threshold value after the convergence of learn.

According to a fourth aspect of this invention, in the abnormality detecting apparatus for the automatic speed changer, the abnormality detection controlling means is adapted to judge whether a change direction of a learned value of the current case is the same as or opposite to that of the previous case, to count up a learned value change direction reversing number counter in the opposite case, and to record that the condition as abnormal when the value of the learned value change direction reversing number counter is not less than a predetermined value.

According to a fifth aspect of this invention, there is provided an abnormality detecting apparatus for an automatic speed changer, comprising: a speed change controlling means for controlling the automatic speed changer; a learn controlling means for optimizing an rpm change at the time of speed change control by the speed change controlling means; and an abnormality detection controlling means for counting up a learn control execution number counter when the learn control is executed by the learn controlling means, counting up learned value change number counter if a change presence/absence judgment of the learned value shows that there is a change in the learned value, and recording the condition as abnormal if the value of the learn control execution number counter is not less than a first predetermined value when a value obtained by subtracting the value of the learn valued value change number counter from the value of the learn control execution number counter is not greater than a second predetermined value.

According to a sixth aspect of this invention, the abnormality detecting apparatus for the automatic speed changer further comprises a learned value record controlling means for counting up a learn execution number counter when a learn control is executed by the learn control means, judging whether there is a change in the learned value and judging a change direction when the learned value is changed, recording that the counted value of the learn execution number counter at this time and the fact that the learn direction is plus when the change direction is plus, and recording that the counted value of the learn execution number counter at this time and the fact that the learn direction is minus when the change direction is minus.

DESCRIPTION OF THE PREFERRED EMBODIMENTS

Embodiment 1

Figure 1:
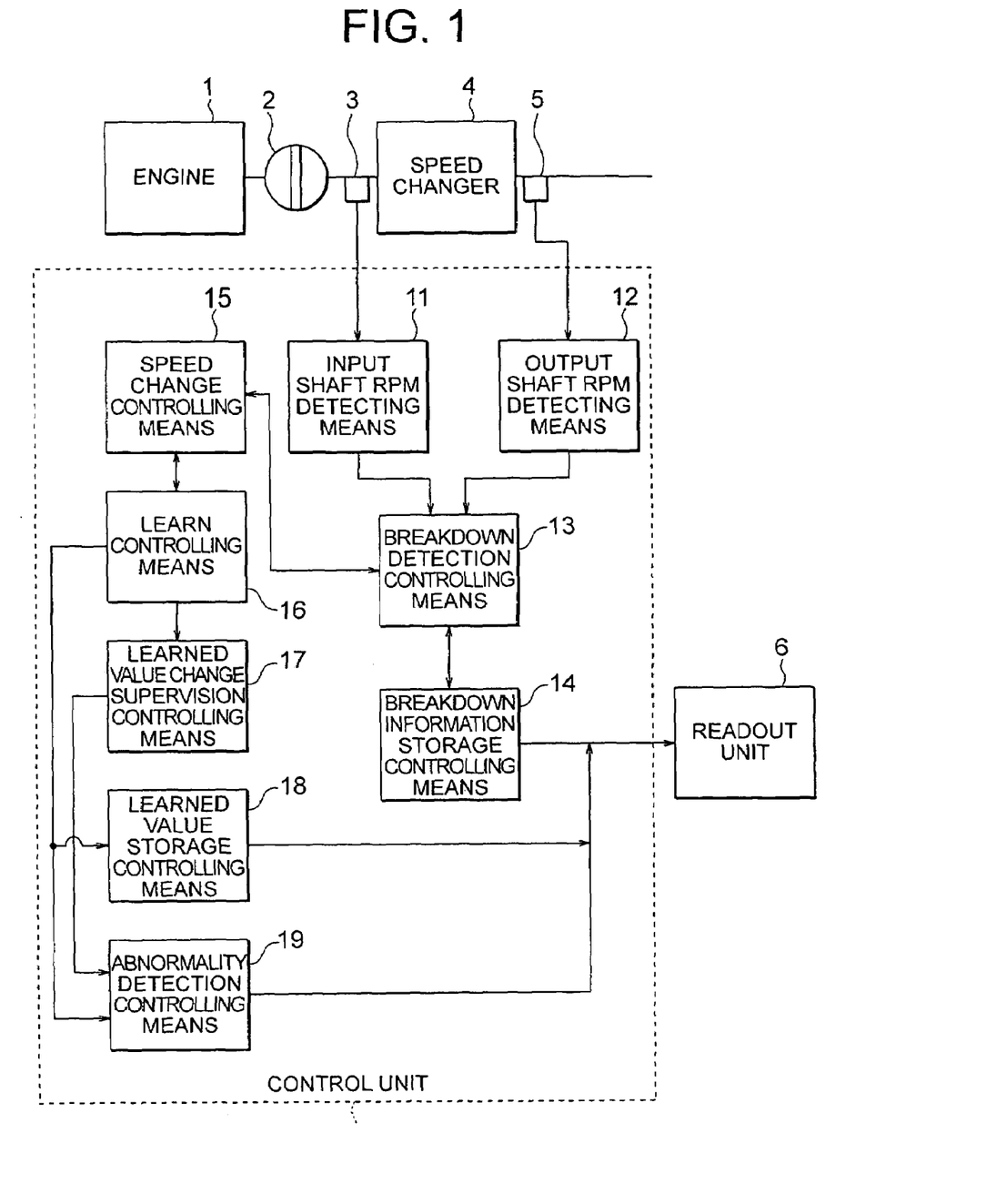
FIG. 1 is a view showing the structure of an abnormality detecting apparatus for an automatic speed changer in accordance with embodiment 1 of this invention.

An abnormality detecting apparatus for an automatic speed changer in accordance with embodiment 1 of this invention will now be described with reference to the accompanying drawings. FIG. 1 is a view showing the structure of an abnormality detecting apparatus for an automatic speed changer in accordance with embodiment 1 of this invention. In each drawing, the same reference numerals are used to indicate the same or like parts.

In FIG. 1, reference numeral 1 denotes an engine, numeral 2 denotes a torque converter, numeral 3 denotes an input shaft rpm sensor, numeral 4 denotes an automatic speed changer, numeral 5 denotes an output shaft rpm sensor and numeral 6 denotes a readout unit.

Reference numeral 10A denotes a control unit (abnormality detecting apparatus for the automatic speed changer), numeral 11 denotes an input shaft rpm detecting means, numeral 12 denotes an output shaft rpm detecting means, numeral 13 denotes a breakdown detection controlling means, numeral 14 denotes a breakdown information storage controlling means, numeral 15 denotes a speed change controlling means for controlling the automatic speed changer 4 and numeral 16 denotes a learning controlling means for optimizing an rpm change at the time of controlling the speed change. Numeral 17 denotes a learned value change supervision controlling means, numeral 18 denotes a learned value record controlling means and numeral 19 denotes an abnormality detection controlling means.

Note that, each means in the interior of the control unit 10A is actually constituted of a software package and the mutual relationship between the respective means is indicated by arrows.

The operation of the abnormality detecting apparatus for the automatic speed changer in accordance with embodiment 1 will now be described with reference to the drawings.

The abnormality detecting apparatus for the automatic speed changer in accordance with this invention will detect abnormality on the basis of the following judgement standards.

Figure 2:
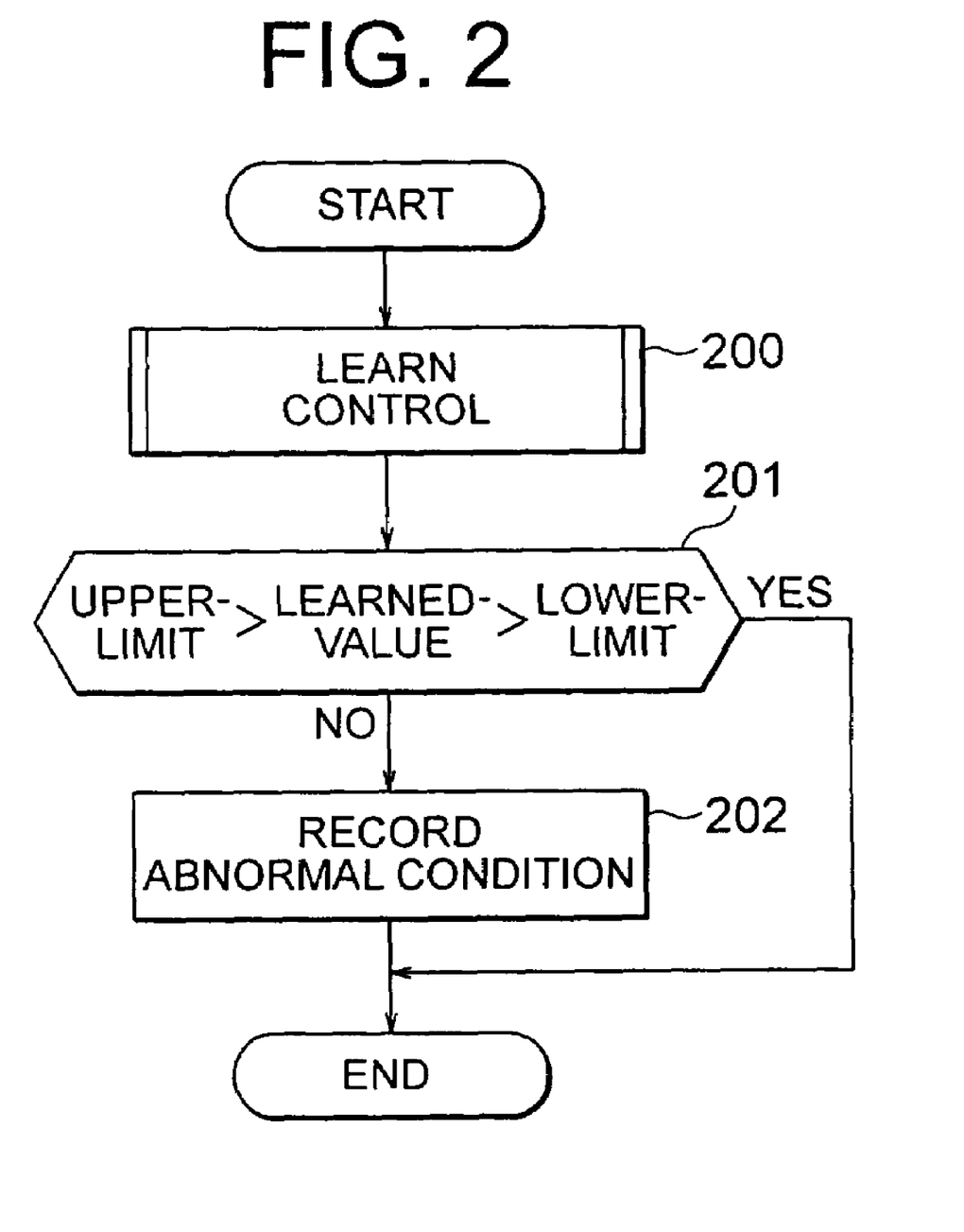
FIG. 2 is a flowchart showing an abnormality detecting operation by upper and lower limit judgement of a learned value of an abnormality detecting apparatus for an automatic speed changer in accordance with embodiment 1 of this invention.

(1) The abnormality detection by the judgement that the learned value is out of the upper and lower limits of the range (see FIG. 2).

Figure 3:
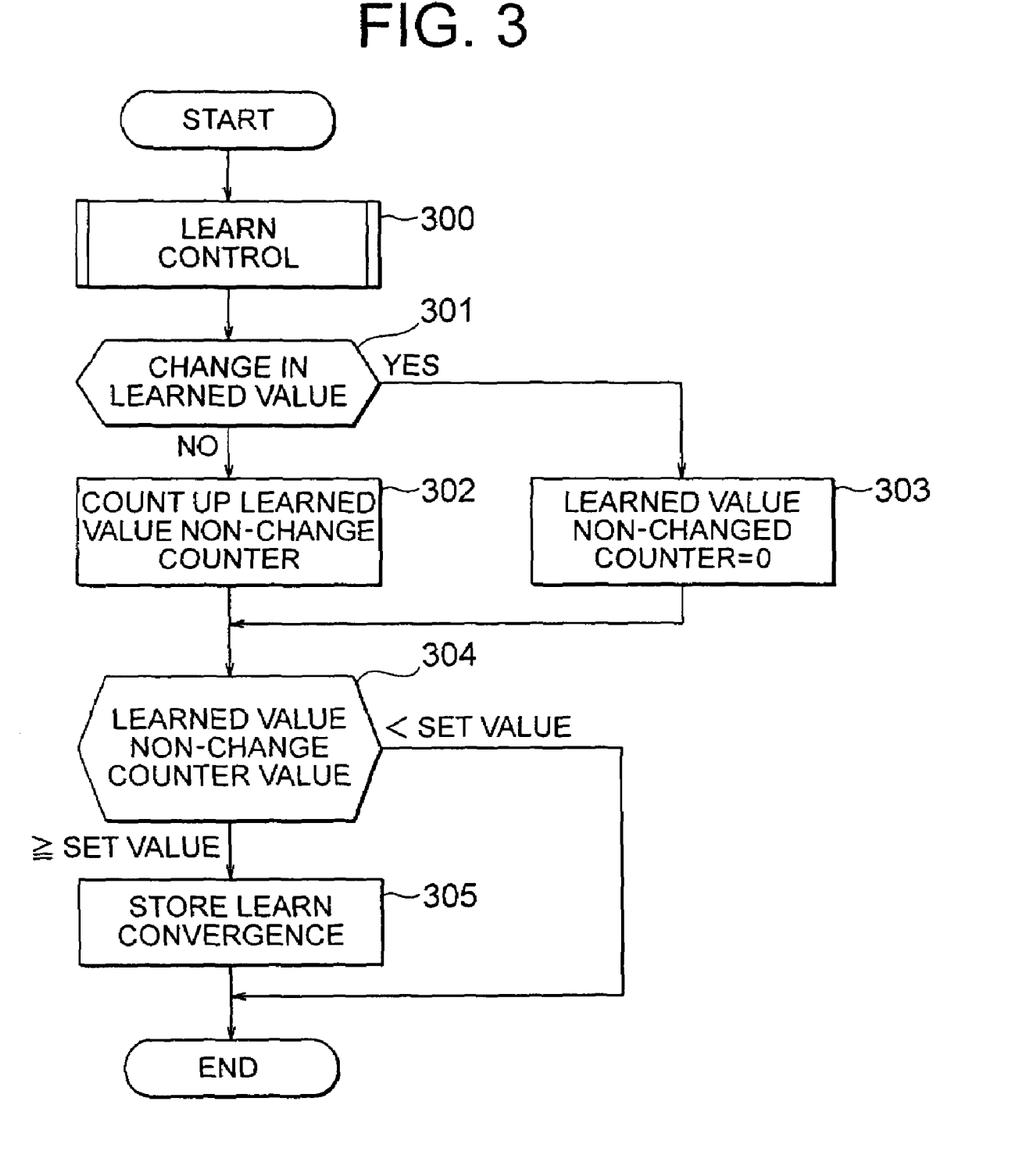
FIG. 3 is a flowchart showing a learn convergence judgement operation of the abnormality detection apparatus for the automatic speed changer in accordance with embodiment 1 of this invention.
Figure 4:
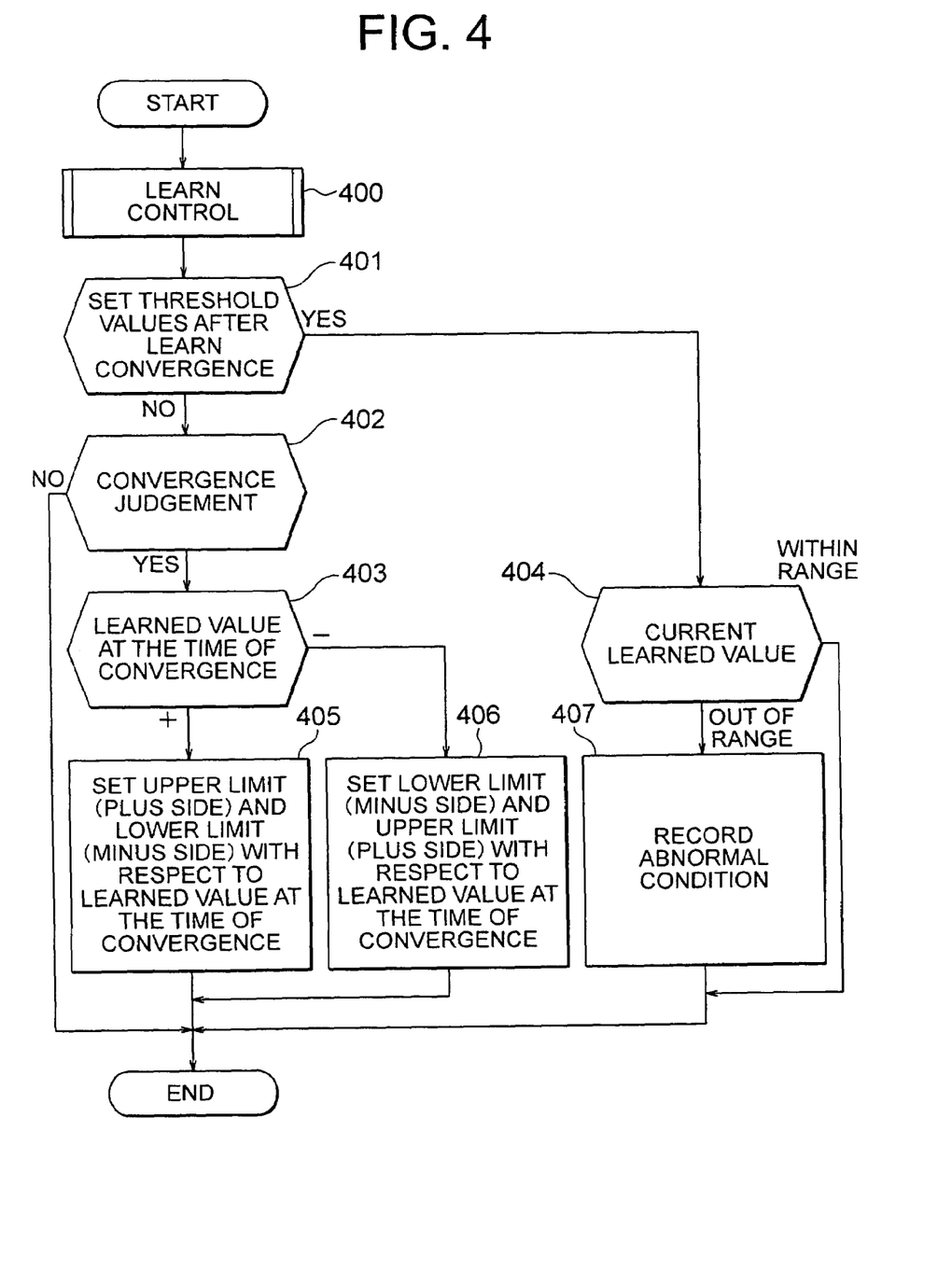
FIG. 4 is a flowchart showing an abnormality detecting operation in accordance with upper and lower limit judgement of a learned value after learn convergence of the abnormality detecting apparatus for the automatic speed changer in accordance with embodiment 1 of this invention.

(2) The abnormality detection by a judgement that the learned value after convergence of the learned value is out of range of the upper and lower limits (see FIGS. 3 and 4).

Figure 5:
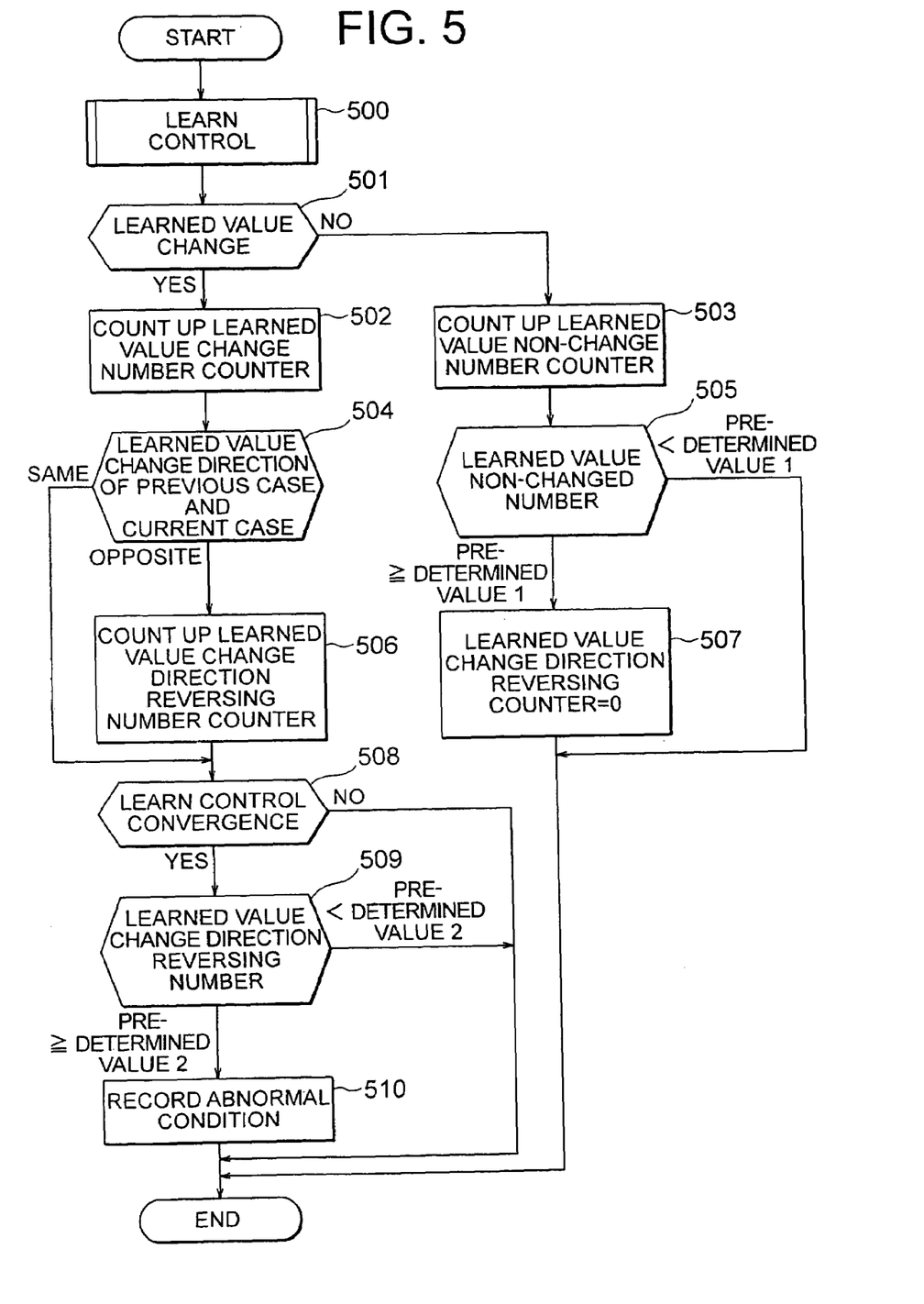
FIG. 5 is a flowchart showing an abnormality detecting operation in accordance with a learn direction judgement after learn convergence of an abnormality detecting apparatus for an automatic speed changer in accordance with embodiment 1 of this invention.

(3) The abnormality detection by a learning direction judgement after the learned value convergence (see FIGS. 3 and 5).

Figure 6:
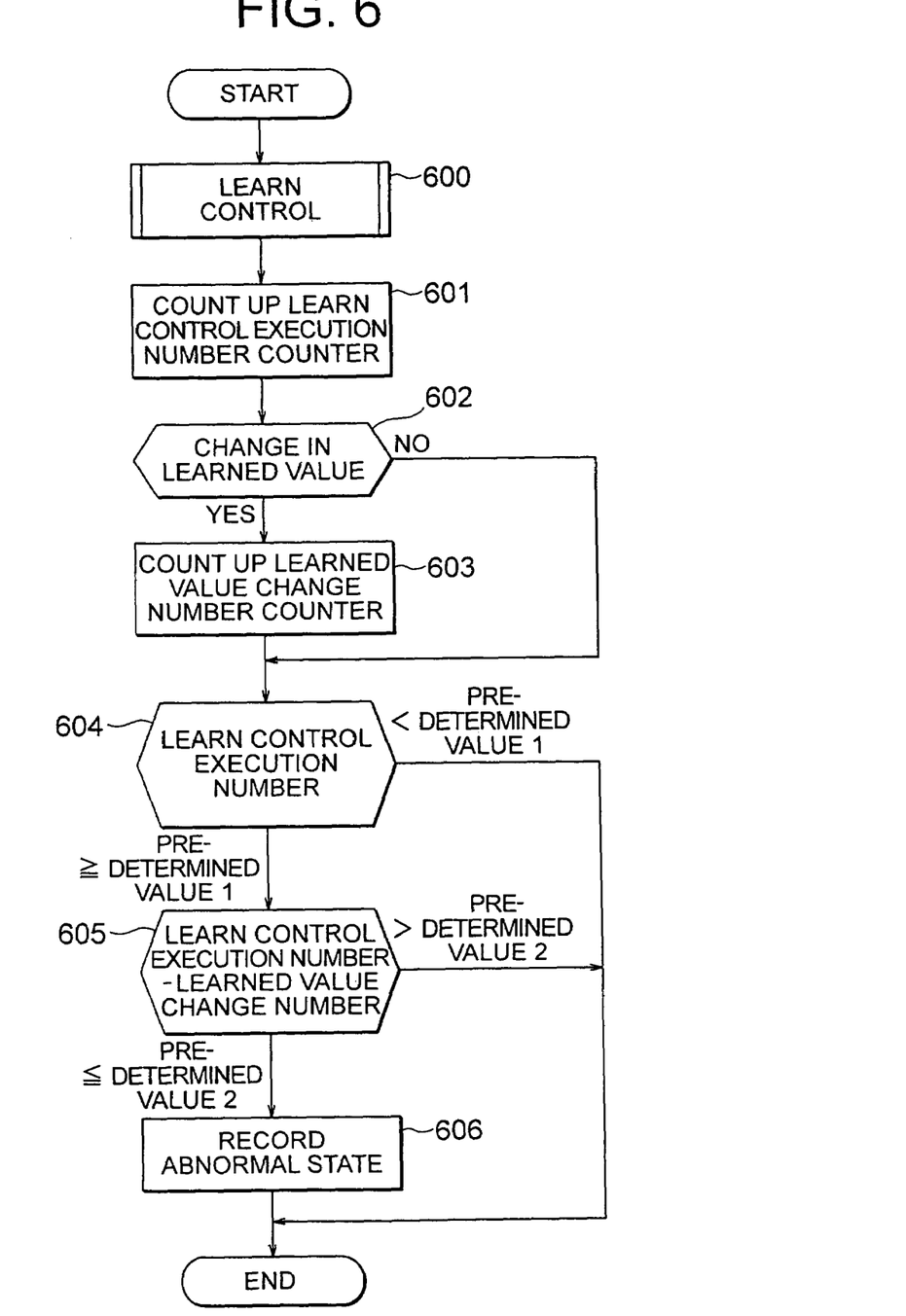
FIG. 6 is a flowchart showing an abnormality detecting operation in accordance with a learn non-convergence judgement of an abnormality detecting apparatus for an automatic speed changer in accordance with embodiment 1 of this invention.

(4) The abnormality detection by a non-convergence of the learned value (see FIG. 6).

Figure 7:
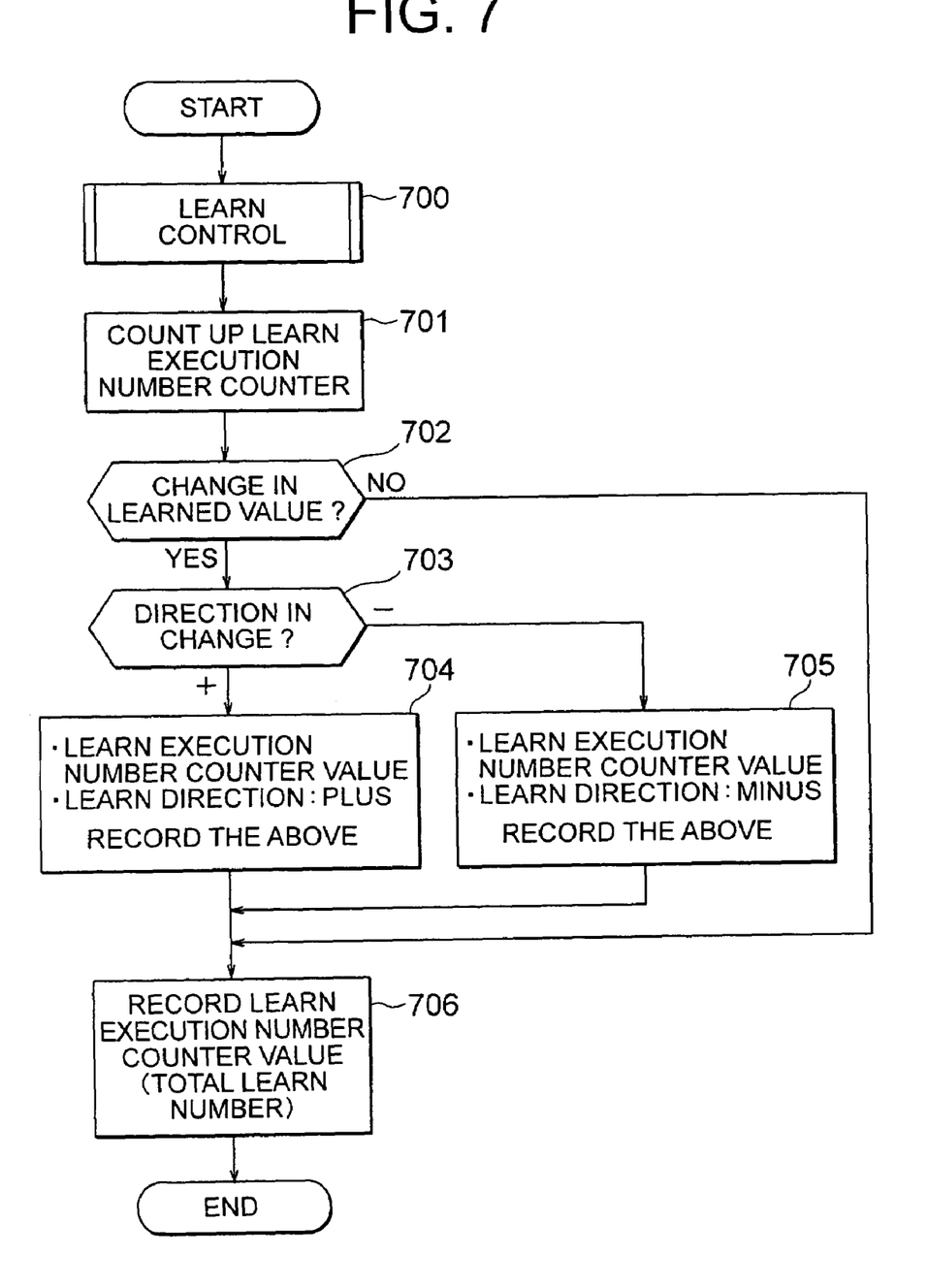
FIG. 7 is a flowchart showing a learn information recording operation of an abnormality detecting apparatus for an automatic speed changer in accordance with embodiment 1 of this invention.

(5) An indirect abnormality detection by recording the learning information (see FIG. 7).

FIG. 2 is a flowchart showing the abnormality detecting operation by the upper and lower limit judgement of the learned value of the abnormality detecting apparatus for the automatic speed changer in accordance with embodiment 1 of this invention.

The speed change of the automatic speed changer 4 is effected by controlling the hydraulic pressure by a solenoid controlled by the control unit 10A, operating a clutch by the hydraulic pressure and changing the grip of internal rotary constituents.

However, the internal rotary constituents involve inevitable variation at the time of manufacturing, and it is difficult to perform an optimum control by a standardized method.

In this regard, a learning control is well known as a method in which a target value (hydraulic pressure) is provided for speed change control, learning control being performed so as to approach the target value.

The learned value (hydraulic pressure) obtained through this learning control is converged to absorb the variation at the time of mass-manufacturing when learning is performed in the condition in which the learning control has not been effected yet. That is, by supervising the learned value, which represents the variation of the internal rotary constituents, it is possible to know the condition of the internal rotary constituents.

Generally, there is a range for the learned value. That is, for ordinary variation at manufacturing, the learning control is converged within its learning range.

Conversely, in the case where the learning control is be effected beyond the range, there is some abnormality. Accordingly, it is possible to detect the abnormal condition of the automatic speed changer 4 before it becomes broken down by detecting that.

For instance, in the case where the speed change behavior is slow, the hydraulic pressure is increased to firmly grip the clutch that is the coupling element so that the speed change behavior is made faster and the learning is effected so as to increase the hydraulic pressure. However, in the case where the speed change behavior is not improved at all, it is clear that the coupling element is abnormal. If the speed change is impossible, it is possible to detect the condition by the conventional breakdown detection controlling means 13, but in the case where the speed change is still possible, it is impossible to detect the condition in the conventional technique.

Therefore, as shown in FIG. 2, the range that the learned value may take (from the lower limit to the upper limit) is set. If the learned value exceeds this range, it is judged that the condition is abnormal.

First, in step 200, the learning controlling means 16 executes the learning control.

Subsequently, in step 201, the abnormality detection controlling means 19 judges whether or not the learned value is within the range between the lower limit and the upper limit.

Then, in step 202, the abnormality detection controlling means 19 records it as an abnormality condition when the learned value falls out of the range.

When the learned value exceeds the suitable range without convergence, it is possible to infer that the learned value represents a production failure of the automatic speed changer 4. Also, from the statistics of the learned values, if the same phenomenon appears in the automatic speed changers 4 produced in the same production period, it is possible to find out a problem in the production line.

Subsequently, the number of times of learning and a change therein are supervised to thereby detect the abnormal condition.

FIG. 3 is a flowchart showing a learn convergence judgement operation of the abnormality detection apparatus for the automatic speed changer in accordance with embodiment 1 of this invention.

In the case where the learn number is small, i.e., in the learn initial stage, as described above, the learned value changes to absorb the manufacture variation and will be converged thereafter.

Therefore, as shown in FIG. 3, the number of non-changes of the learned values is counted and compared with a predetermined set value. If the learned values are not changed over the counted number, it is judged that the condition is converged.

First, in step 300, the learning controlling means 16 executes the learning control.

Subsequently, in steps 301 to 303, the learned value change supervision controlling means 17 judges whether there is any change in learned values. If the learned value is not changed, the learned value non-change counter is counted up, whereas if the learned value is changed, the counter is set at zero.

Then, in steps 304 to 305, the learned value change supervision controlling means 17 judges the learned value non-changed counter value in accordance with the set value. If the counter value exceeds the set value, the means judges that the learned value is converged and stores this.

Subsequently, threshold values (upper and lower limits) used in the abnormality judgement of the behavior of the re-change after the above-described learn convergence is set.

FIG. 4 is a flowchart showing the abnormality detecting operation in accordance with the upper and lower limit judgement of the learned value after the learn convergence of the abnormality detecting apparatus for the automatic speed changer in accordance with embodiment 1 of this invention.

As shown in FIG. 4, when the learn is made in a plus direction or a minus direction from the condition in which the learned value is zero, and converged, threshold values (upper and lower limits) are set in the learn changed amount from the convergence point in the same direction as or the opposite direction to the learn direction.

First, in step 400, the learn controlling means 16 executes the learn controlling.

Subsequently, in steps 401, 402 to 403 and 405 to 406, the abnormality detection controlling means 19 finishes when the learn is not converged in the case where the threshold values after the convergence are not set yet, and set the threshold values after the learn convergence in the case where the learn is converged (See the record of the learn convergence according to the learned value change supervision controlling means 17). That is, when the learn is converged in the plus direction, the upper limit (plus side) and the lower limit (minus side) are set with respect to the learned value at the time of the convergence. Also, when the learn is converged in the minus direction, the lower limit (minus side) and the upper limit (plus side) are set with respect to the learned value at the time of the convergence.

On the other hand, in steps 401, 404 and 407, the abnormality detection controlling means 19 judges the current learned value in the case where the threshold values after the learn convergence has been set, and stores it as the abnormal condition when the current learned value exceeds the threshold values (the range from the upper limit to the lower limit) after the learn convergence.

FIG. 5 is a flowchart showing the abnormality detecting operation in accordance with a learn direction judgement after the learn convergence of the abnormality detecting apparatus for the automatic speed changer in accordance with embodiment 1 of this invention.

Also, as shown in FIG. 5, the number of executions of learn since the learned value is changed again after the learn convergence judgement has been set, and a set value is provided at the number by which the learn control is reversed in the plus direction or in the minus direction within the set number. Then, it is judged that the condition is abnormal in the case where the reverse number in the changed direction of the learned value exceeding this set value is confirmed.

First, in step 500, the learn controlling means 16 executes the learn control.

Subsequently, in steps 501 to 502, the abnormality detection controlling means 19 judges whether there is a change in learned values. In the case where the change is present, the learned value change number counter is counted up.

Subsequently, in steps 504 and 506, the abnormality detection controlling means 19 judges whether the change direction of the learned value is the same or reversed in the previous case and the current case, and counts up the learned value change direction reversing number counter in the latter case.

Subsequently, in steps 508 to 510, the abnormality detection controlling means 19 judges whether the learn control has been converged (See the record of the learn convergence according to the learned value change supervision controlling means 17), if the learn control has been converged, judges the learned value change direction reversing number counter value in accordance with the set value 2, and if the value is equal to or greater than the set value 2, stores the condition as abnormal.

On the other hand, in steps 501, 503, 505 and 507, the abnormality detection controlling means 19 counts up the number of non-changes of learned values in the case where the learned value is not changed, and causes the learned value change direction reversing number counter to be set at zero in the case where the learned value non-change number counter value is equal to or more than the set value 1.

Thus, it is possible to detect that the automatic speed changer 4 that has been kept in the normal condition is brought into an abnormal condition for some reason, and it is possible to find out the abnormal condition before the breakdown by confirming it at the periodical inspection.

Subsequently, when the learn control is started from the condition in which the learn control has not been effected and the learned value is changed but the value has not been converged in the predetermined learn control execution number, this is detected as abnormality.

FIG. 6 is a flowchart showing an abnormality detecting operation in accordance with the learn non-convergence judgement of the abnormality detecting apparatus for the automatic speed changer in accordance with embodiment 1 of this invention.

As shown in FIG. 6, if the learn control execution number is counted from the learn control start and is equal to or more than set value 1, a set value 2 of is provided as the value obtained by subtracting the learned value change number from the learn controlling execution number.

First, in step 600, the learn control means 16 executes the learn control.

Subsequently, in steps 601 to 603, the abnormality detection controlling means 19 counts up the learn control execution counter and judges whether there is a change in the learned values. When there is a change, the means counts up the learned value change number counter.

Subsequently, in steps 604 to 606, the abnormality detection controlling means 19 judges the learned control execution number in accordance with the set value 1. If it is not less than the set value 1, the value obtained by subtracting the learned value change number from the learn controlling execution number is not greater than the set value 2, i.e., the learn is effected over a fixed number of times. In the case where the change of the learned value is large, this is stored as the abnormal condition.

Thus, it is possible to infer the production failure of the automatic speed changer 4. Also, from statistics of the learned values, if the same phenomenon appears in the automatic speed changers 4 that in the same production period, it is possible to find out the problems in production line.

Subsequently, the history of the changes in the learned value will be stored.

FIG. 7 is a flowchart showing the recording operation of learn information of the abnormality detecting apparatus for the automatic speed changer in accordance with embodiment 1 of this invention.

As shown in FIG. 7, in the case where the number of executions of learn control is counted from the condition in which the learn is not effected and in the case where a learned value is changed, the counted value and the learn direction, i.e., the plus side or the minus side is recorded. Further, the current count value is also recorded so that it is possible to analyze how the learn has been changed and when the learn is changed. For instance, in the above-described abnormal condition judgement, in the case where the normal learn change behavior is not confirmed although this is not judged as the abnormality, it becomes an indirect abnormality judgement factor.

First of all, in step 700, the learn control means 16 executes the learn control.

Subsequently, in steps 701 to 705, the learned value recording controlling means 18 counts up the learn execution number counter to judge whether there is a change in the learned value. Therefore, in the case where the learned value is changed, the direction in which the learned value changes is judged, and if the changed direction is plus, the learn execution number counter value at this time and the fact that the learn direction is plus are recorded. Also, if the changed direction is minus, the learn execution number counter value at this time and the fact that the learn direction is minus are recorded.

Then, in step 706, the learned value recording controlling means 18 also records the total number of the learn controls.

Thus, at the time of the detection of the abnormality condition, at the time of the breakdown, or when the user raises some complaint, the stored information is analyzed whereby this serves as information that is available for the analysis including the lapse time as to how the factors cause the abnormal condition. In particular, where the complaint content that could not readily be reproduced out of the complaints of the users, this becomes particularly important information since the information has been recorded in the time sequence.

Incidentally, the above-described abnormality judgement content and the record of the history of the learn change may be read out by means of the readout unit 6 connected to the outside. Thus, at the time of the periodical inspection, the value or the result is confirmed so that the condition of the automatic speed changer 4 may be known. Also, by taking statistics of the picked-up data, the manufacture period and the condition of the variation and the condition of the secular change of the automatic speed changers per se may be confirmed. This may be useful for future development and production technology.

As described above, according to the present invention, it is possible to detect the abnormality condition of the constituents such as a clutch within the automatic speed changer prior to the generation of breakdown. Also, it is possible to confirm the record of the secular change of the learned value.

What is claimed is:

1. An abnormality detecting apparatus for an automatic speed changer, comprising:
   a speed change controlling means for controlling the automatic speed changer;
   a learn controlling means for optimizing a rpm change at the time of speed change control by said speed change controlling means;
   an abnormality detection controlling means which judges whether a learned value of said learn controlling means falls within a range between an upper limit and a lower limit and if the learned value falls out of the range, and stores the condition as abnormal; and
   a learned value record controlling means for counting up a learn execution number counter when learn control is executed by said learn control means, judging whether there is a change in the learned value and judging a change direction when the learned value is changed, storing the counted value of the learn execution number counter and the learn direction.

2. The abnormality detection apparatus according to claim 1, wherein the abnormality detection controlling means further judges whether abnormality exists based on the counted value and the learn direction.

3. The abnormality detection apparatus according to claim 2, wherein the learn direction is a plus when the change direction is plus or a minus when the change direction is a minus.

4. The abnormality detection apparatus according to claim 1, wherein the stored counted value and the learn direction indicate an abnormality in a functioning of the automatic speed changer before the speed changer is non-operational and is provided to the abnormality detection controlling means for further judgment of the condition.

5. The abnormality detection apparatus according to claim 4, wherein the learner direction is a plus when the change direction is plus or a minus when the change direction is a minus.

6. The abnormality detection apparatus according to claim 1, wherein the learner direction is a plus when the change direction is plus or a minus when the change direction is a minus.

* * * * *